United States Patent
Vakili et al.

(10) Patent No.: US 6,990,278 B2
(45) Date of Patent: Jan. 24, 2006

(54) MODE MULTIPLEXING OPTICAL COUPLING DEVICE

(75) Inventors: Masoud Vakili, Toronto (CA); Ashkan Alavi-Harati, Scarborough (CA); Paul Rivett, Scarborough (CA); Jining Yuan, North York (CA)

(73) Assignee: Coherent, Inc., Santa Clara, CA (US)

( * ) Notice: Subject to any disclaimer, the term of this patent is extended or adjusted under 35 U.S.C. 154(b) by 77 days.

(21) Appl. No.: 10/933,846

(22) Filed: Sep. 3, 2004

(65) Prior Publication Data

US 2005/0031266 A1 Feb. 10, 2005

Related U.S. Application Data

(62) Division of application No. 10/004,849, filed on Dec. 7, 2001, now Pat. No. 6,823,117.

(51) Int. Cl.
*G02B 6/26* (2006.01)

(52) U.S. Cl. .......................... 385/46; 385/43; 385/115; 385/116

(58) Field of Classification Search ............. 350/96.16, 350/96.15, 122; 385/33, 24, 29, 43, 46, 27, 385/54, 39, 115, 116
See application file for complete search history.

(56) References Cited

U.S. PATENT DOCUMENTS

| | | | | |
|---|---|---|---|---|
| 4,330,170 A | | 5/1982 | Johnson et al. .......... 350/96.16 |
| 4,449,781 A | | 5/1984 | Lightstone et al. ...... 350/96.15 |
| 4,550,974 A | | 11/1985 | Murphy .................... 350/96.15 |
| 4,666,234 A | | 5/1987 | Emkey ..................... 350/96.15 |
| 4,836,644 A | | 6/1989 | Eisenmann et al. ....... 350/96.16 |
| 4,906,810 A | | 3/1990 | Sharma et al. .......... 219/121.46 |
| 4,913,507 A | | 4/1990 | Stamnitz et al. ............. 385/122 |
| 4,997,247 A | | 3/1991 | Stowe ...................... 350/96.15 |
| 5,117,473 A | | 5/1992 | Pan .............................. 385/33 |
| 5,190,364 A | | 3/1993 | Imoto et al. ................... 385/24 |
| 5,339,372 A | | 8/1994 | Miller et al. .................. 385/29 |
| 5,412,745 A | | 5/1995 | Weidman et al. .............. 385/43 |
| 5,664,037 A | | 9/1997 | Weidman ...................... 385/46 |
| 5,809,189 A | | 9/1998 | Murphy et al. ................ 385/43 |
| 5,864,644 A | * | 1/1999 | DiGiovanni et al. .......... 385/43 |
| 5,966,484 A | | 10/1999 | Yuuki ........................... 385/43 |
| 6,134,362 A | | 10/2000 | Au-Yeung et al. ............ 385/43 |
| 6,408,119 B1 | | 6/2002 | Meltz et al. ................... 385/43 |
| 6,434,295 B1 | | 8/2002 | MacCormack et al. ....... 385/27 |
| 6,434,302 B1 | | 8/2002 | Fidric et al. ................... 385/43 |
| 6,467,969 B1 | | 10/2002 | Shmulovich ................. 385/54 |
| 6,546,168 B1 | | 4/2003 | Xie et al. ...................... 385/39 |
| 6,629,784 B1 | | 10/2003 | Bricheno et al. ............. 385/43 |
| 2002/0094168 A1 | | 7/2002 | Cai et al. ...................... 385/43 |

* cited by examiner

*Primary Examiner*—Frank G. Font
*Assistant Examiner*—James P. Hughes
(74) *Attorney, Agent, or Firm*—Stallman & Pollock LLP

(57) ABSTRACT

An efficient tapered optical fiber bundle along with the method of manufacturing is presented. The tapered fiber bundle is fully fused to an induced shape with no interstitial space between fibers. To minimize fiber deformation and hence the tapered bundle's loss, the individual fibers are minimally deformed by positioning them in a fixture with predetermined geometry prior to fusion. The bundle could be optionally reshaped after fusion. The tapered bundle could then be used in its original form as a star coupler, or it could be cleaved and coupled to a multimode fiber, a multi-clad fiber, a cladding-pumped fiber, or an optical system to form an optical device. The resulting optical device has improved efficiency and lower loss compared with prior art devices.

20 Claims, 4 Drawing Sheets

MODE MULTIPLEXING OPTICAL COUPLING DEVICE

CLAIM OF PRIORITY

This application is a divisional of U.S. patent application Ser. No. 10/004,849, filed Dec. 7, 2001, now U.S. Pat. No. 6,823,117, entitled "MODE MULTIPLEXING OPTICAL COUPLING DEVICE," which is hereby incorporated herein by reference.

TECHNICAL FIELD OF THE INVENTION

The present invention relates generally to optical devices. More particularly, the present invention relates to mode multiplexing optical coupling devices, such as mode multiplexing combiners for use with fiber lasers, fiber pumped solid-state lasers, and optical amplifiers, as well as to optical couplers and splitters based on mode managed optical coupling.

BACKGROUND

Fused coupler technology, wherein optical fibers are bundled together, heated, and pulled lengthwise, is commonly used to produce couplers, combiners and splitters for optical communication systems, medical devices and other industrial applications. Generally, a combiner is a passive fiber optic coupler in which power from several input fibers is combined into one output fiber. Conversely, a splitter divides light from a single input fiber into two or more output fibers. The coupler represents the general case where inputs from one or more fibers are mixed and distributed among one or more output fibers.

Combiners in particular are seeing new applications for diode pumped lasers, including fiber lasers and solid-state lasers, and diode pumped optical amplifiers. They are used to combine multimode optical pump power from a multiple sources, such as multimode laser diodes, and transfer the combined pump power into the inner cladding of a multiclad fiber or into a multimode fiber. A multiclad fiber typically has a small core (that typically transmits a singlemode or a small number of modes) surrounded by an inner cladding layer of lower refractive index and significantly larger cross-section that transmits the multimode pump power. An outer cladding of even lower refractive index causes the multimode pump power to be confined in the inner cladding by total internal reflection. The multiclad fiber is used to combine a singlemode (or multimode mode) signal in the core, along with multimode pump power in the inner cladding, to a separate device which may be used for amplification. These mode multiplexing combiners are typically used with cladding-pumped fibers. Cladding-pumped fibers are a special case of multiclad fiber where the multimode light propagates within the core and inner cladding interacting with special dopants (such as rare-earth elements like Er) in the core that absorb the pump photons and radiate photons at a different wavelength. Under suitable conditions, the special dopants in the core cause stimulated or spontaneous emission at the different wavelength and can operate in the form of a fiber laser or optical amplifier. Multiclad fibers containing special dopants for the purpose of lasing or amplification are known as cladding-pumped fibers.

For any coupler, splitter, or combiner, it is desirable to maximize the throughput of optical power from any input fiber, through the device, and through any output fiber. For convenience, the case of a combiner is further described, recognizing that the same principles apply equally to splitters and couplers. The throughput depends on efficiently transferring the total brightness from all the input fibers into a single output fiber having sufficient capacity to carry the combined brightness. This transfer can be analysed using modal analysis, ray-tracing methods, or by simple matching of input and output brightness. Conservation of brightness is based on the LaGrange Invariant of an optical system and is typically characterized by the quantity etendue, which is the product of the area of illumination times the extended solid angle. For a fixed level of optical power, increased brightness implies a decrease in etendue. For a step index multimode optical fiber, the etendue can be approximated by $E=\pi^2/4\ NA^2D^2$. If such a step index fiber is tapered, its etendue remains constant while the effective numeric aperture (NA) increases as the diameter (D) decreases. In this analysis, the NA refers to the maximum angle of light entering or exiting the optical fiber according to NA=sin (acceptance angle).

In order to efficiently transfer power between two optical elements (in this case from an input fiber bundle into an output fiber), two requirements must be satisfied. First, the etendue on the input side should be less than or equal to the etendue on the output side, otherwise the coupling efficiency will be limited by $E_{out}/E_{in}$. Second, the areas must be matched at the junction.

Prior art combiners, such as that described in U.S. Pat. No. 5,864,644 to DiGiovanni et al., rely on the tapering process to eliminate interstitial voids between input fibers, and to develop a suitable circular cross-section in the input fiber bundle. However, it is not possible to solely rely on the tapering process to achieve the requirements for low loss combiners, especially when there is a range in the number of input ports, or if the output fiber is non-circular.

It is, therefore, desirable to provide an improved optical coupling device that substantially eliminates interstitial spacing between input fibers, while providing a good cross-sectional match between the input fiber bundle and the output fiber independent of the number of fibers bundled together.

BRIEF SUMMARY

It is an object of the present invention to obviate or mitigate at least one disadvantage of previous optical coupling devices, such as combiners and splitters. It is a particular object of the present invention to provide an improved optical coupling device that has reduced insertion loss in a wide range of combinations of fiber types, sizes, shapes, and number of ports.

In a first aspect, the present invention provides a tapered optical fiber bundle. The tapered optical fiber bundle consists of a plurality of optical fibers formed into a fiber bundle with a minimized encircling radius. The bundle is adiabatically tapered, and heavily-fused into an induced compact shape with fibers minimally deformed and no interstitial space between the optical fibers. The optical fibers can be multimode, singlemode, multiclad, or cladding-pumped, and one or more of the ports may be terminated. Terminated ports are fibers that are included in the bundle only to form part of the geometric or optical structure, but are subsequently cut-off outside the fused region using a technique to minimize reflection from the cut endface.

In a further aspect, the present invention provides an optical fiber device, such as an optical combiner, an optical splitter, an optical coupler, for use in an optical system such as a cladding-pumped fiber laser, fiber pumped solid-state laser, or a cladding-pumped optical amplifier. The optical fiber device consists of a tapered fiber bundle coupled to a multimode, multiclad, or cladding-pumped optical fiber, a second tapered fiber bundle, or a bulk optical device (such as a solid-state laser element). The coupling process maximizes the transfer of power (and signal) from the inputs to the outputs by virtue of the optimized brightness contained in the input bundle.

In yet another aspect, the present invention provides a method of manufacturing the tapered fiber bundle. First, a plurality of optical fibers, decoated to remove any polymer or metallic coating layers in the region where they will be heated, are positioned in a predetermined configuration that will result forming a minimized encircling radius. The positioned fibers are then twisted and bundled under controlled tension to result in a fiber bundle with minimized encircling radius. An adhesive can be used at both sides of the bundle to secure the positioning. The bundle is then heated and pulled to heavily fuse the fibers, while adiabatically tapering the bundle, into an induced shape with no interstitial space between minimally deformed fibers. If desired, glass cladding can be fully or partially removed prior to fusing the bundle. Also one or more singlemode (or multimode) fibers can be incorporated into the bundle at appropriate locations such that their position in the resulting tapered bundle corresponds to similar singlemode (or multimode) cores in an output bundle or multiclad fiber or cladding-pumped fiber.

To form an optical fiber device according to the present invention, the fused and tapered bundle is cleaved at the tapered region. The cleaved bundle endface is optionally reshaped by fusion splicing it to an output fiber of appropriate shape, then recleaving again. The splicing and re-cleaving can be repeated, if desired, until surface tension during fusion splicing causes the cleaved end to approach the desired cross-sectional geometry. The reshaped cleaved end is then coupled to a suitable optical element, such as a single optical fiber, a second tapered fiber bundle, or a bulk optical device (such as a solid-state laser element). The method of the present invention can include pre-tapering of the output fiber, post-tapering of the junction between the tapered fiber bundle and an output fiber or bundle, and re-coating the junction with a coating material, such as polymer or metallic material.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

Embodiments of the present invention will now be described, by way of example only, with reference to the attached Figures, wherein.

DETAILED DESCRIPTION

Figure 1:
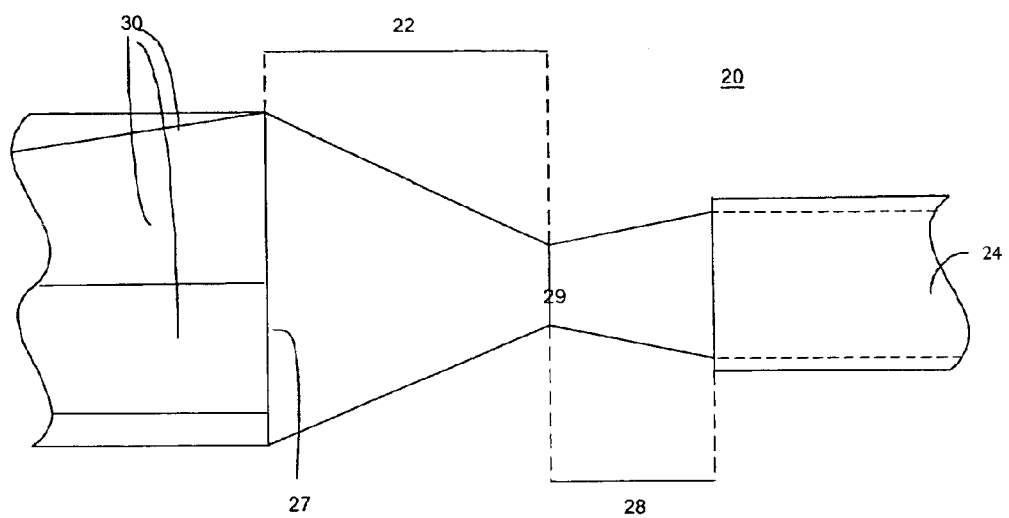
FIG. 1 is a schematic representation of a mode multiplexing optical coupling device according to an embodiment of the present invention.

Generally, the present invention provides a mode multiplexing optical coupling device, and a method of making such a device. The optical device, and related fabrication process, have one or more input fibers that are fused and tapered and can be coupled to one or more output fibers, such that the optimum cross-sectional shape of the fused region depends on the specific details of the output fiber or fibers. For ease of description, the following discussion is limited to the case of a mode multiplexing combiner having a single output fiber of circular cross-section. However, this is not intended to limit the generality of the present invention, and it is clearly within the contemplation of the inventors that the present invention can be used with multiple output fibers, and/or with output fibers having non-circular cross-sections.

The object of a mode multiplexing combiner is to maximize the transfer of power by maximizing the number of multimode fibers of specified NA and core diameter that can efficiently transfer power into a multimode, multiclad, or cladding-pumped output fiber of specified dimensions and NA. To efficiently transfer power from a multifiber input bundle to an output fiber, the input fibers are ideally bundled to minimize the aggregate etendue, without causing microbending loss in the optical fibers. A coupling device 20 according to an embodiment of the present invention is illustrated schematically in FIG. 1. The coupling device 20 consists of a number of fibers 30 formed into a tapered fiber bundle 22, and spliced to an output fiber 24. The absolute minimum aggregate etendue occurs if the input fibers: first have all cladding removed, second are fused as a bundle to eliminate all interstitial space between them, and third the fused bundle is in the formed to a circular cross-section. Such a device is problematic to fabricate because the transmission loss is high due to the substantial core deformation. In addition, the structure is weak due to the complete removal of the cladding layer, which reduces the strength of the glass and prevents the use of a structural adhesive on the unclad fiber. Instead, a practical, optimized configuration and process is required to minimize aggregate etendue of an input fiber bundle. This is achieved by:

i) selecting an initial geometric configuration of the input fibers to maximize packing efficiency, such that the fibers are encompassed by the smallest possible circle before fusing. This minimizes the deformation of cores when the fiber bundle is tapered and fully fused. The optimum geometric configuration is not always based on hexagonal close-packed geometry.

ii) fully fusing the fibers to obtain a degree of fusion close to one, thereby eliminating interstitial space between and around the fibers.

iii) selectively removing some or all of the fiber cladding from some or all of the input fibers to further reduce the aggregate bundle etendue, allowing any remaining cladding to amalgamate, and allowing the cores of the fibers to deform by a minimal amount in order to obtain a substantially circular bundle.

iv) tapering the fibers with the primary objectives of (a) maintaining adiabatic tapering conditions to avoid power loss in the bundle and (b) promoting radial fusion between the fibers.

Generally, in the case of polymer clad fiber, the cladding is always removed because it is not compatible with the fusing process. In the case of glass clad fiber, the cladding can be partly removed (for example, by chemical etching) when specifically required to reduce the etendue of an input bundle below that of the output fiber.

As used herein, the packing efficiency (PE) is the ratio between the area of a circle circumscribing the fiber bundle before fusing (Ax) and the sum of the area of all the untapered fibers in the bundle ($A_0$). The object is to optimize the initial fiber orientation to minimize PE. The degree of tapering (DOT) is the ratio of the tapered core diameter to the untapered diameter. The degree of fusion (DOF) ranges from 0 before fusion occurs, to 1 when the fibers are completely fused into a circular cross-section. DOF is based on the area of a circle circumscribing all of the fibers in the bundle (A).

$$DOF=(A_X-A)/(A_X-A_0).$$

It is preferable to minimize etendue by obtaining a DOF of 1, which requires the fiber bundle to contain no interstitial spaces and to have a perfectly circular perimeter, after the fusing process and the subsequent splicing process. The deformation ratio (DR) is the ratio of the largest width to the smallest width of any deformed core shape within the fused and tapered bundle. This value is 1.0 if the core is not deformed, and generally low propagation losses are observed if DR remains below 2.0.

Once a fused bundle with DOF of 1 has been fabricated, the objective is to efficiently transfer power from the input fibers into an output fiber, the cross-sectional areas of the input and output elements are matched as closely as possible, since the etendue can not be increased or decreased by further tapering of either side. Efficient power transfer can be enhanced by:

i) matching the fiber/bundle diameter on both sides, either by continuing to taper the input bundle side, or by pretapering the output side;

ii) fusion splicing the two sides together;

iii) optionally recleaving and resplicing the two sides very close to the previous splice, using the surface tension during the successive fusion splices to assist in matching the shapes between the two ends;

iv) optionally post tapering the region of the fusion spliced junction.

The etendue of a fiber bundle cannot be reduced by merely tapering the fibers to match the size of the output fiber—therefore limiting low loss devices to those where the etendue of the input fiber bundle is less than or equal to that of the output fiber before fusing and tapering. It has been found that the preferred manner in which to reduce the etendue of the input fiber bundle is to remove interstitial space between the input fibers and obtain a circular bundle perimeter, which requires extensive fusing. In practice the pulling process used to taper the input fiber bundle facilitates fusing, often leading to bundle taper diameters smaller than the output fiber diameter. Therefore, a pretapered output fiber 28, as illustrated, is used to minimize losses by matching the diameter of the fully fused fiber bundle. An output taper ratio of final diameter to initial diameter of ~0.6, and a taper length of ~3 mm are currently used. In a presently preferred embodiment, the tapered region 28 of the output fiber 24 has its polymer cladding removed, exposing the tapered region 28 to air.

Figure 3A:
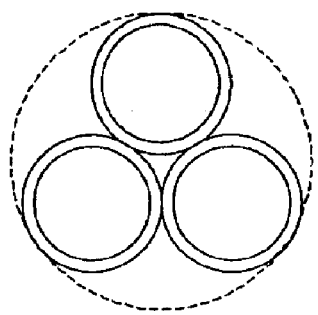
FIGS. 3a–3c are cross-sections of three multimode fibers bundled according to the present invention.
Figure 3B:
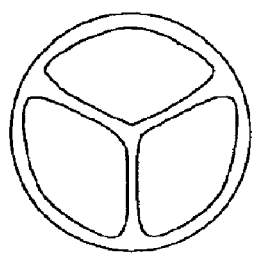
Figure 3C:
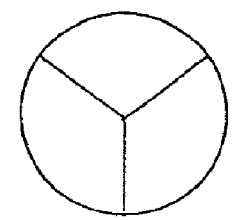

As an example, consider the case of three input multimode step index fibers, each with 105 micron core diameter, 125 micron cladding diameter, and 0.22 NA, as shown in FIGS. 3a–3c. An unfused, untapered bundle of these fibers will have an overall diameter of 269 microns, and an effective NA of 0.22, as shown in FIG. 3a. The circumscribed area is A =Ax=56,855 $\mu m^2$ for a degree of fusion of 0. The etendue of the bundle is 8,642 $\mu m^2$-str. Tapering the bundle will not change the etendue. Removing the interstitial space to a DOF=1 without removing the cladding, as shown in FIG. 3b, results in a final diameter of 216 microns with an effective NA of 0.22 for an etendue of 5,572 $\mu m^2$-str, or a 36% improvement over the unfused bundle. By completely removing all the cladding and again eliminating interstitial space to a DOF=1, as shown in FIG. 3c, results in a final bundle diameter of 182 microns and an effective NA of 0.22, for an etendue of 3,956 $\mu m^2$-str. This represents an additional 18% improvement, and is the lowest possible etendue for the such a fiber bundle.

Figure 4A:
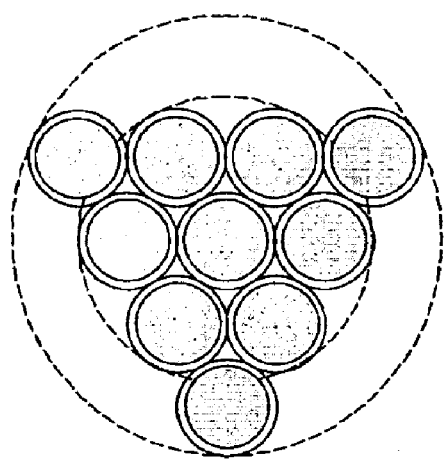
FIGS. 4a and 4b are cross-sections of ten multimode fibers bundled according to the present invention.
Figure 4B:
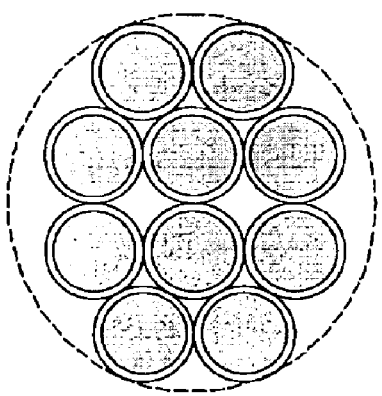

In a second example, as shown in FIGS. 4a and 4b, ten input fibers are formed into a bundle. There is more than one way to arrange the fibers. The base area of ten fibers with 125 micron diameter is 12,718 $\mu m^2$. FIG. 4a shows the natural hexagonal closed packed configuration, which is often assumed to be the optimum packing configuration. The area of the circle around the fibers is 271,547 $\mu m^2$, resulting in a PE of 2.2. FIG. 4b shows an 8 around 2 configuration. This configuration is contained by a smaller circular diameter before fusing, having an area of 187,805 $\mu m^2$, for a PE of 1.5. While both configurations can fuse to a circular bundle with DOF=1, the configuration of FIG. 3b, because of its smaller PE, will more easily form a circular bundle and will result in a fused bundle with lower deformation of the cores.

Figure 2:
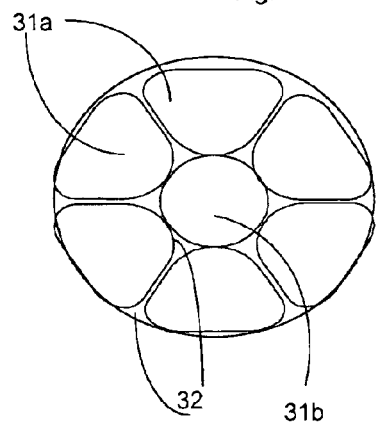
FIG. 2 shows an exemplary 7-1 tapered fiber bundle according to the present invention.

FIG. 2 shows a cross-sectional view at the splice 29 (as shown in FIG. 1) of an exemplary 7-1 input fiber bundle. The input fiber consists of seven 125 micron multimode fibers. The input fiber bundle is tapered over the tapered region 22, such that at the splice 29 the fibers are tight-packed, and heavily fused. This results in the individual fibers undergoing induced deformation such that the cores 31a and 31b deform from their initial circular shape, and the cladding 32 surrounding the fibers is amalgamated and redistributed to form an overall circular shape. Typically, the input fiber bundle taper length over the tapered region 22 will be ~3 mm, and the ratio of the diameter of the cleaved end to the initial diameter of the bundle will be ~0.25. This is shown in actual cross-sections of tapered fiber bundles in FIGS. 6a–6f. FIGS. 6a–6f also demonstrate the absence of interstitial spacing between the fibers and near circular cross section achieved by the method of the present invention for two, three, four, eight, ten and sixteen fibers.

In addition to using multimode input fibers, one or more singlemode fibers can be incorporated into the bundle. For example, if it is desired to couple multimode pump light into the inner cladding of a multiclad fiber while simultaneously coupling singlemode light out of or into the singlemode core of the same multiclad fiber, the central fiber 29b can be a singlemode fiber. Such simultaneous singlemode and multimode coupling to a multiclad or cladding-pumped fiber facilitates the transfer of signal and pump power to a cladding-pumped fiber for the construction of devices such as cladding-pumped fiber amplifiers. Similarly, a central fiber that couples multimode light, or only a limited number of modes into, or out of, a multiclad or cladding-pumped fiber can be used.

Figure 5:
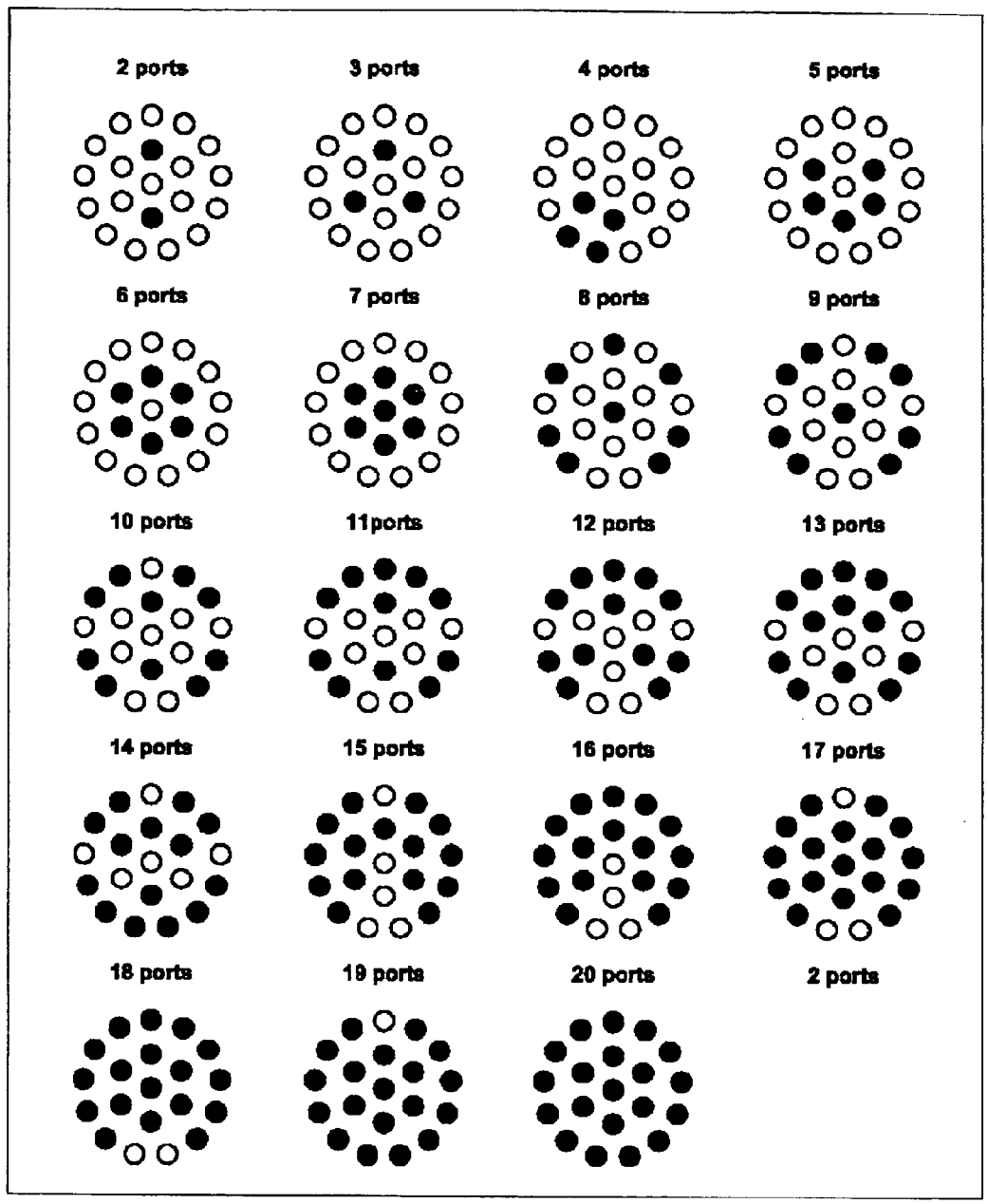
FIG. 5 shows exemplary fixtures to secure fiber bundle configurations, prior to fusing and tapering, for two to twenty fibers, respectively.
Figure 6A:
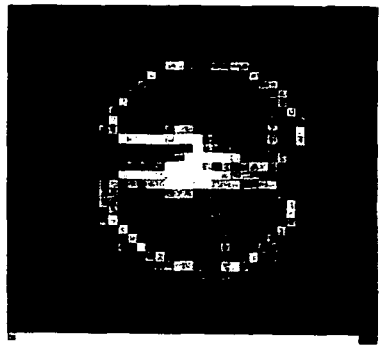
FIGS. 6a to 6f are cross-sections of tapered fiber bundles having two, three, four, eight, ten and sixteen fibers, manufactured according to the method of the present invention.
Figure 6B:
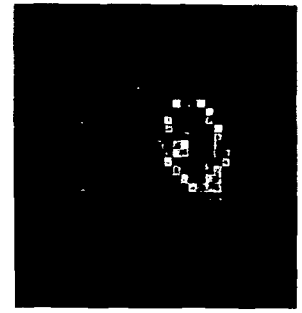
Figure 6C:
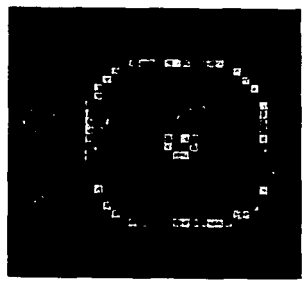
Figure 6D:
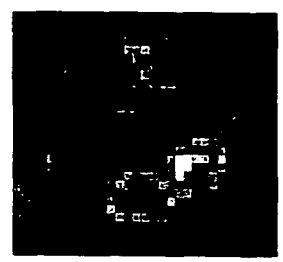
Figure 6E:
Figure 6F:

A tapered fiber bundle according to the present invention can be manufactured as follows. First, individual input fibers are arranged in a predetermined configuration and are decoated. The glass cladding of the input fibers can be left on the fibers and incorporated into the tapered fiber bundle, or, optionally, the cladding can be removed or partly removed prior to tapering. Typical multimode fibers have a 100 micron diameter pure silica core, surrounded by a 125 micron outer diameter fluorine doped silica cladding, and a numerical aperture of 0.22. A rotatable fixture, can be used to maintain the fibers in the predetermined configuration. Exemplary configurations for forming input fiber bundles with from two to twenty input fibers are shown in FIG. 5. The illustrated configurations have been found to provide the desired tight packed input bundle, and to ensure minimal deformation of the input fibers. It should be noted that the optimum initial configuration of fibers in a bundle does not necessarily imply "hexagonal close packing" or "maximum number of adjacent fibers", but is the orientation that minimizes etendue by arranging the fibers in the smallest circle (assuming the output fiber is circular). These optimum configurations are achieved by correct alignment of tension controlled fibers prior to fusing and tapering using the patterns in FIG. 5, leading to the fused exemplary geometries shown in FIGS. 6a–6f.

The bundled fibers are twisted which applies normal compressive forces between the fibers under tension. The twisted bundle is typically bonded on both sides to form a mechanically stable structure. The fiber bundle can, for example, be bonded with a suitable adhesive, away from the heat of the fusion process. The bonding prevents individual fibers from shifting relative to each other in subsequent steps, and maintains desired geometrical and physical stability. During the twisting and bonding, a precisely controlled longitudinal tension is applied to each input fiber to maintain the desired positioning geometry. Tensioning is in the range of from 5–20 gm.

The twisted and bonded bundle is then heated and pulled to form a heavily fused, tight-packed, tapered fiber region where the individual fibers, including their cores, are deformed. Thus, interstitial spaces between adjacent fibers are reduced or eliminated and the bundle is close to circular in cross section. The heavily fused fiber bundle is then cleaved to expose a cleaved end. In a presently preferred embodiment, the fiber bundle is cleaved near the center of the fused area.

The diameter of the bundle is measured and the output fiber is pretapered to match the bundle size. The bundle and pretapered output fiber are then fusion spliced. Optionally, the bundle is recleaved about 100–300 microns from the splice. The two ends are respliced together to better form a circular cross-section. Surface tension causes the cleaved end of the input fiber bundle to approximate the shape and size of the output fiber. This splicing and cleaving can, optionally, be repeated until the end of the input fiber bundle more precisely approaches a desired circular cross-section.

Optical fiber devices, such as optical couplers, combiners, splitters, fiber lasers and optical amplifiers, can then be formed by fusion splicing the cleaved end of the input fiber bundle to an output fiber, such as a multimode, multiclad, or cladding-pumped fiber. In the case of a multiclad or cladding-pumped output fiber, light transfer efficiency between the core of singlemode fiber in the input bundle and the corresponding singlemode core of the output fiber can be enhanced prior to fusion splicing by heating the fiber to cause diffusion between the core and cladding, thereby expanding the mode field of the singlemode core. This will help compensate for the expanded mode field caused by tapering the corresponding singlemode core in the bundle.

Furthermore, when splicing a singlemode fiber (in a bundle) to the corresponding core of a multiclad fiber, high precision core alignment is necessary. The tapered fiber bundle of the present invention can also be spliced to an output tapered fiber bundle to form a coupler, or can be coupled to a bulk optical device (such as a solid-state laser element) if desired. A splitter can be formed by using a combiner in the reverse direction, or by using a coupler with all except one input terminated.

The resulting optical fiber device can be post tapered to improve mode matching between the input fiber bundle and the output fiber. The junction area between the tapered fiber bundle and the coupled outputs can also be recoated with a suitable coating material, such as polymer or metallic coatings.

Optical fiber devices according to the present invention have numerous advantages over conventional optical devices. Insertion losses are reduced and coupling efficiency improved due to the degree of cross-sectional match between the input fiber bundle and output fiber, the degree of fusion of the bundle, and the precision of the splice between the input bundle and the output fiber. At high power transmission, low loss is a critical feature as optical losses will generate heat in the device.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of manufacturing an optical fiber device, comprising:

bundling a plurality of optical fibers to result in a fiber bundle with non-hexagonal packing where a cross-sectional shape of the fiber bundle has an encircling radius smaller than can be obtained with hexagonal packing; and heating and pulling the fiber bundle to heavily fuse the fiber bundle in an adiabatically tapered region into an induced shape having no interstitial space between fibers, the optical fibers in the adiabatically tapered region being less deformed than would be possible with hexagonal packing at the same induced shape.

2. The method of claim 1, further including controlling the tension applied on individual optical fibers during bundling.

3. The method of claim 1, further including twisting the plurality of optical fibers.

4. The method of claim 1, further including bonding the plurality of optical fibers with an adhesive to secure their positions before fusing and tapering.

5. The method of claim 1, further including cleaving the bundle at the tapered region.

6. The method of claim 5, where the cleaved end of the bundle is reshaped into a desired cross-section by, at least once, fusion splicing the cleaved end to an optical fiber to match its cross-sectional geometry, and re-cleaving the optical fiber bundle.

7. The method of claim 5, further including coupling the cleaved end to an optical system.

8. The method of claim 5, further including fusion splicing the cleaved end to one of a single optical fiber and an output tapered fiber bundle.

9. The method of claim 8, further including pre-tapering the single optical fiber.

10. The method of claim 8, further including post-tapering of a junction between the tapered fiber bundle and the one of the single optical fiber and the tapered fiber bundle.

11. The method of claim 1, further including at least partially removing cladding from the plurality of optical fibers.

12. The method of claim 8, further including at least partially removing cladding from the one of the output optical fiber and the output tapered fiber bundle.

13. The method of claim 8, further including re-coating at least part of a junction between the tapered fiber bundle and the one of the output optical fiber and the output tapered fiber bundle with a coating material.

14. The method of claim 13, wherein the coating material is one of polymer and metallic coatings materials.

15. The method of claim 8, further including heating the single optical fiber to diffuse a core of the single optical fiber in order to improve the transfer of light from a corresponding singlemode fiber in the input bundle.

16. A method of manufacturing an optical fiber device, comprising:
   bundling a plurality of optical fibers while controlling the tension applied on individual optical fibers to result in a fiber bundle with non-hexagonal packing and a cross-sectional shape that has an encircling radius smaller than can be obtained with hexagonal packing;
   bonding the bundled plurality of optical fibers with an adhesive to secure their positions in the bundle; and
   heavily fusing the fiber bundle in an adiabatically tapered region into an induced shape with no interstitial space between fibers, the optical fibers in the adiabatically tapered region being less deformed than would be possible with hexagonal packing at the same induced shave.

17. The method of claim 16, further including cleaving the bundle at the tapered region.

18. The method of claim 17, where the cleaved end of the bundle is reshaped into a desired cross-section by, at least once, fusion splicing the cleaved end to an optical fiber to match its cross-sectional geometry, and re-cleaving the optical fiber bundle.

19. The method of claim 17, further including coupling the cleaved end to an optical system.

20. A method of manufacturing an optical fiber device, comprising:
   twisting a plurality of positioned optical fibers to result in a fiber bundle with non-hexagonal packing and a cross-sectional shape that has an encircling radius smaller than can be obtained with hexagonal packing;
   bonding the twisted optical fibers with an adhesive to secure their positions in the bundle;
   heating and pulling the fiber bundle to heavily fuse the fiber bundle in an adiabatically tapered region into an induced shape with no interstitial space between fibers, the optical fibers in the adiabatically tapered region being less deformed than would be possible with hexagonal packing at the same induced shape; and
   cleaving the bundle at the tapered region for coupling to an optical system.

* * * * *